United States Patent
Amaya-Benitez (10) Patent No.: US 11,675,048 B2
(45) Date of Patent: Jun. 13, 2023

(54) TIME-OF-FLIGHT ACQUISITION METHOD AND TIME-OF-FLIGHT CAMERA

(71) Applicant: Sony Semiconductor Solutions Corporation, Kanagawa (JP)

(72) Inventor: Manuel Amaya-Benitez, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1119 days.

(21) Appl. No.: 16/190,181

(22) Filed: Nov. 14, 2018

(65) Prior Publication Data

US 2019/0162824 A1    May 30, 2019

(30) Foreign Application Priority Data

Nov. 30, 2017 (EP) ..................... 17204649

(51) Int. Cl.
G01S 7/48 (2006.01)
G01S 7/484 (2006.01)
G01S 17/894 (2020.01)
H04N 23/74 (2023.01)
H04N 25/67 (2023.01)

(52) U.S. Cl.
CPC .............. *G01S 7/48* (2013.01); *G01S 7/4804* (2013.01); *G01S 7/484* (2013.01); *G01S 17/894* (2020.01); *H04N 23/74* (2023.01); *H04N 25/67* (2023.01)

(58) Field of Classification Search
CPC .......... G01S 7/48; G01S 7/4804; G01S 7/484; G01S 17/894; G01S 7/4802; G01S 7/481; G01S 7/4817; G01S 17/36; G01S 17/10; G01S 17/87; H04N 5/2354; H04N 5/365; H04N 13/204
See application file for complete search history.

(56) References Cited

U.S. PATENT DOCUMENTS 7,405,812 B1    7/2008 Bamji
9,247,238 B2    1/2016 Izadi et al.
(Continued)

FOREIGN PATENT DOCUMENTS

CN    103975250 A    8/2014
CN    104838284 A    8/2015
(Continued)

OTHER PUBLICATIONS

Achar, S., et al., "Epipolar Time-of-Flight Imaging," ACM Transactions on Graphics (TOG), vol. 36, Issue 4, Article 37, pp. 37:1-37:8 (Jul. 2017).

Büttgen, B., and Seitz, P., "Robust Optical Time-of-Flight Range Imaging Based on Smart Pixel Structures," IEEE Transactions on Circuits and Systems I: Regular Papers, vol. 55, Issue 6, pp. 1512-1525 (Jul. 2008).

(Continued)

*Primary Examiner* — Lin Ye
*Assistant Examiner* — Tuan H Le
(74) *Attorney, Agent, or Firm* — Xsensus LLP (57) ABSTRACT

A time-of-flight camera has;
an illumination source for illuminating a scene;
an image sensor for detecting light; and
a processor configured to:
control the image sensor for scanning a scene for detecting illumination;
determine a time slot for illumination of the scene, based on the scanning result of the scene; and
control the illumination source to illuminate the scene in the determined time slot, based on a time-division multiple access scheme.

20 Claims, 6 Drawing Sheets

(56) References Cited

U.S. PATENT DOCUMENTS

| | | | |
|---|---|---|---|
| 2007/0182949 A1* | 8/2007 | Niclass | G01S 7/491 356/3 |
| 2012/0098964 A1 | 4/2012 | Oggier et al. | |
| 2015/0054974 A1* | 2/2015 | Ehmann | G06T 7/11 348/218.1 |
| 2016/0349359 A1 | 12/2016 | Nevet | |
| 2017/0180703 A1* | 6/2017 | Kovacovsky | G01S 17/89 |
| 2017/0188019 A1 | 6/2017 | Kashyap | |
| 2018/0064399 A1* | 3/2018 | Buettgen | G01S 7/4915 |

FOREIGN PATENT DOCUMENTS

| | | |
|---|---|---|
| CN | 105705962 A | 6/2016 |
| EP | 2 594 959 A1 | 5/2013 |

OTHER PUBLICATIONS

Li, L., et al. "Multi-Camera Interference Cancellation of Time-of Flight (TOF) Cameras," 2015 IEEE International Conference on Image Processing (ICIP), pp. 556-560 (Sep. 27-30, 2015).

Medina, C., et al., "A Synchronous TDMA Ultrsonic TOF Measurement System for Low-Power Wireless Sensor Networks," IEEE Instrumentation and Measurement, vol. 62, Issue 3, pp. 599-611 (Mar. 2013).

Mure-Dubois, J. and Hügli, H., "Fusion of Time of Flight Camera Point Clouds," Workshop on Multi-camera and Multi-modal Sensor Fusion Algorithms and Applications, pp. 1-13 (Oct. 5, 2008).

Puhm, A., et al., "An algorithm to Evaluate and Build Schedules for a Distributed Sensor System with Respect to Clock Synchronization," The Ninth International Conference on Sensor Technologies and Applications, pp. 64-70 (Aug. 23, 2015).

\* cited by examiner

TIME-OF-FLIGHT ACQUISITION METHOD AND TIME-OF-FLIGHT CAMERA

CROSS-REFERENCE TO RELATED APPLICATIONS

The present application claims priority to European Patent Application 17204649.2 filed by the European Patent Office on 30 Nov. 2017, the entire contents of which is being incorporated herein by reference.

TECHNICAL FIELD

The present disclosure generally pertains to a time-of-flight acquisition method and a time-of-flight camera.

TECHNICAL BACKGROUND

Generally, time-of-flight (ToF) involves a variety of methods, which measure the time that an object, particle or wave needs for traveling a distance in a medium. Typically, ToF cameras can obtain depth measurements of the objects in a scene, e.g. for every pixel of the image simultaneously. For instance, a ToF camera illuminates the scene with a modulated wave, images the wave backscattered by the scene by using a sensor array with a modulated gain.

When two or more asynchronous ToF cameras try to obtain depth images of the same scene, they may experience crosstalk, i.e. the illumination (modulation signal) of a camera can interfere with the illumination of another camera(s), which may cause errors in measurements.

In such a ToF multi-camera scenario, an implementation based on Space-Division Multiple Access (SDMA) or on Wavelength-Division Multiple Access (WDMA) may not fully avoid the cause of errors in measurements.

For instance, SDMA requires each camera to illuminate different parts of the scene, such that this salutation is not useful for cases, where a scene is to be illuminated with multiple ToF cameras.

The use of WDMA may involve difficulties due to having many ToF sensors with different wavelength sensitivities in the same multi-camera scenario.

Known approaches to cope with the previously described situation are, for example: Frequency-Division Multiple Access (FDMA), Code-Division Multiple Access (CDMA), Epipolar-ToF (EpiToF), and interference cancellation techniques.

FDMA is based on the use of different modulation frequencies applied to the illumination of each camera.

In CDMA, a different code is super-imposed onto the modulation signal (illumination) of each camera.

Although these two approaches might reduce the effects of the crosstalk or mutual interference, they may not completely remove it, and they may not suppress the influence of the different cameras on each other in terms of shot noise.

EpiToF images the scene by sweeping a sheet of illumination, what typically reduces the probability of interferences in a multi-camera scenario. However, EpiTof still has several challenges to be adopted. For instance, it typically has a complex hardware, and its performance and advantages are limited by the amount of illumination power in use and the sensor readout time. In many applications, the eye safety requirements regulate the illumination power, resulting in a performance below other ToF solutions.

Some interference cancellation techniques have shown good results with ToF multi-camera setups, when the scene is static, but they have not proved the same good results when the elements of the scene are moving. Usually, these algorithms need several frames of the same scene for removing the interference.

Although there exist techniques for time-of-flight acquisition, it is generally desirable to provide an improved time-of-flight acquisition method and a time-of-flight camera.

SUMMARY

According to a first aspect, due disclosure provides a time-of-flight camera, including: an illumination source for illuminating a scene; an image sensor for detecting light; and a processor configured to: control the image sensor for scanning a scene for detecting illumination; determine a time slot for illumination of the scene, based on the scanning result of the scene; and control the illumination source to illuminate the scene in the determined time slot, based on a time-division multiple access scheme.

According to a second aspect, the disclosure provides a time-of-flight acquisition method for a time-of-flight camera, the method including: scanning a scene for detecting illumination; determining a time slot for illumination of the scene, based on the scanning result of the scene; and illuminating the scene in the determined time slot, based on a time-division multiple access scheme.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
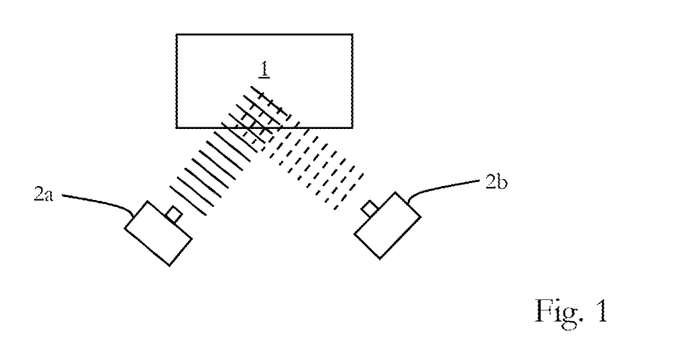
FIG. 1 illustrates illumination a scene with two time-of-flight (ToF) cameras.

Before a detailed description of the embodiments under reference of FIG. 1 is given, general explanations are made.

As discussed in the outset, several methods for time-of-flight (ToF) acquisition are known, but, in particular, in cases where multiple ToF cameras illuminate a scene simultaneously, measurement errors may be caused due to crosstalk in the prior art.

It has been recognized that in the prior art to scan the whole frame time-line for locating all possible interiering cameras, it may be necessary to scan at least one frame with the camera's own illumination switched off.

Hence, some embodiments pertain to a time-of-flight acquisition method and time-of-flight camera, which may be used in an asynchronous multi-camera scenario, where several time-of-flight cameras illuminate the same scene, without producing any interference or shot-noise, or producing less and shorter episodes of interference or shot noise in the rest of the cameras.

Consequently, some embodiments pertain to a time-of-flight camera, including an illumination source for illuminating a scene; an image sensor for detecting light; and a processor configured to: control the image sensor for scanning a scene for detecting illumination; determine a time slot for illumination of the scene, based on the scanning result of the scene; and control the illumination source to illuminate the scene in the determined time slot, based on a time-division multiple access scheme. Some embodiments also pertain to multi-camera scenarios using asynchronous and time divisional multiple access (TDMA), as also discussed further below.

Generally, a time-of-flight (ToF) camera is known, such that a detailed description of the technical characteristics and function of the ToF camera is omitted. In principle, the illumination source may be any type light source and can be based, for example, on light emitting diodes (LEDs), lasers (e.g. vertical-cavity surface emitting lasers, VCSEL) or the like. Moreover, some embodiments may pertain to direct ToF and some embodiments may pertain to indirect ToF, wherein direct ToF and indirect ToF are generally known technologies.

The image sensor may be based on common principles, such as CCD (charge coupled device) technology, CMOS (complementary metal oxide semiconductor) technology, SPADs (single-photon avalanche diodes) or the like. The image sensor may be a pixel sensor including an array of pixels, wherein each pixel is configured to detect light and to generate an associated signal, as it is generally known.

The processor may include one or more processors, processor cores, digital signal processors, microprocessors, etc.

As discussed above, generally, it may happen that two or more ToF cameras illuminate the same scene simultaneously. In some embodiments, the ToF camera may operate in accordance with a time-division multiple access (TDMA) scheme, which is known per se. However, as discussed, if different ToF cameras use coincident time slots of such a TDMA scheme, then measurement errors may be caused due to crosstalk.

Such as situation is illustrated in FIG. 1, where a scene 1 is illuminated by a first ToF camera 2a and a second ToF camera 2b. As can be seen, in case that the two cameras 2a and 2b illuminate the scene simultaneously, the emitted (and also the backscattered) light may interfere, which may cause measurement errors (as also discussed above), if, for example, the same time slots of a TDMA scheme are used.

By scanning the scene for detecting illumination, another active camera can be recognized, since the light emitted by the other camera can be detected with the image sensor. In some embodiments, the illumination of the ToF camera is off during the scanning of the scene, in order to detect only light emitted by other light sources and other ToF cameras or the like.

Based on the scanning result of the scene a time slot for illumination of the scene can be determined, as will also be discussed further below. The aim is to detect the time slot(s) which are used by one or more other ToF cameras for illuminating a scene a making ToF measurements (or depth measurements), in order to find a free time slot, which can be used.

Then, the processor can control the illumination source to illuminate the scene in the determined time slot (which is assumed to be a free time slot), based on a (TDMA) scheme.

The TDMA scheme may include multiple time slots, each having the same length. Moreover, a collection of time slots may be grouped to a so-called frame. For example, a frame may include 24, 32 or any other number of time slots, without limiting the present disclosure in that regard. In some embodiments, the time duration of a frame is in the millisecond range, e.g. 100 ms, 200 ms, or the like, without limiting the present disclosure in that regard. Then, then time duration of a time slot may be in the microsecond range, e.g. 5 microseconds, 10 microseconds or the like, without limiting the present disclosure in that regard. Of course, generally, the time durations of the frame and the time slots can be freely selected.

The scanning may be performed for a predefined set of time slots or frames or a predefined duration. During the scanning, for example, the TDMA scheme that is used for illuminating the scene and measuring the depth, may be used in order to identify free time slots.

Hence, for example, once the scanning information from a frame time-line is obtained, the possible existence of free time slots is estimated or determined, and a delay is determined which is needed to occupy at least one free time slot. Such a delay may be used, for example, to "shift" or delay the used TDMA scheme in such a manner that illumination and measuring is performed in time slot(s) which is (are) not used by other ToF cameras (or other periodic illumination sources) in the scene which is to be illuminated by the ToF camera.

In the following, a general way of estimating or determining at least one free time slot is explained without limiting the present disclosure in that regard. Additionally, a concrete implementation may depend on the type of illumination or other characteristics, for example, of the ToF camera and the skilled person is able to modify the following equations and principles for adapting the algorithm.

After having scanned the scene, illumination data (in the present notation S) is collected by using an image sensor (or auxiliary image sensor include in the image sensor, as discussed herein). Per a frame time-line slot measurement, the variance of the absolute value of the illumination data is calculated, i.e. $v_i = \text{var}(\text{abs}(S_i))$, wherein the index i identifies the frame time-line slot. This results in a vector v, which has as many values as time slots.

For determining the frame time-line slots occupied by other ToF cameras (or other periodic illumination source), a background threshold $\mu$ is established by calculating an average value of the three smallest values contained in the vector v, and then by multiplying this result by a scalar factor $\alpha$ (of course, also another number of smallest values can be used). Here, for explanation purposes, it is assumed that there exist at least three free time slots, without limiting the present disclosure in that regard. The factor $\alpha$ is used to consider the possible noise variation of the background illumination. Then, when an element of the vector v is larger than the background threshold $\mu$, this indicates that the corresponding frame time-line slot is occupied by the illumination of another camera.

Once the index i of all the free frame time-line slots is known, one time slot of the free frame time slots may be selected. For instance, in some embodiments, a free time slot is selected, which allows the ToF camera to leave at least a free slot between its illumination time slot and the closest occupied time slot(s) (if any). Based, on the selected time slot position in the frame time-line, a time delay can be calculated which is needed to occupy it, e.g. in view of the used TDMA scheme.

In some embodiments, in case it is not possible to find a proper free time slot, the ToF camera stays in a scanning mode, i.e. continuous with scanning of the scene and collecting new frame time-line slot measurements, in order to determine or estimate a free time slot.

In some embodiments, the scanning of the scene is performed after a random idle time. Thereby, it can be avoided that the scanning starts for different ToF cameras at the same point of time.

In some embodiments, the determined time slot is defined by introducing a time delay in a predefined time-division multiple access (TDMA) scheme, as discussed above.

In some embodiments, a regular operation mode and a scanning mode are provided. In the regular operation mode, a regular depth measurement may be performed and the illumination of the scene is performed within the regular operation mode, while the scanning of a scene is performed during the scanning mode, wherein the illumination source may be off during the scanning mode, in order to avoid that illumination of the own illumination source is detected during scanning of the scene.

In some embodiments, the time slot is determined, based on detecting time slots having a higher illumination than an average background illumination, as also discussed above.

In some embodiments, a (partial) scanning of the scene for detecting illumination is performed within the regular operation mode. Thereby, already within the regular operation mode, for instance, new or approaching other ToF cameras (or other period light sources) may be detected. The scanning may be performed during predefined time slots within a frame. Hence, in some embodiments, one frame may be divided in a portion (number of time slots) wherein the regular depth measurement is performed while in another portion of the same frame the scanning is performed (wherein the whole frame is associated with the regular operation mode).

In some embodiments, the scanning is performed with a sub-portion of the image sensor. For instance, as discussed above, an image sensor may include an array of pixels, such that a sub-portion may be defined by assigning a respective number of pixels (e.g. a defined number of rows and/or columns, dividing the array into quadrants and defining one or more of the quadrants as sub-portion, etc.). By using a sub-portion of the image sensor, the read-out of the image sensor may be faster.

In some embodiments, the image sensor comprises an auxiliary image sensor and the scanning is performed with the auxiliary image sensor. Hence, in some embodiments, the image sensor may include a main sensor which is used for the regular operation mode and the depth measurement, and an auxiliary image sensor which is used for the scanning of the scene. The auxiliary image sensor may be a part of the main sensor, but it can also be separated from the main sensor. The auxiliary image sensor may have less pixels as the main image sensor, and/or it may have less resolution, and/or it may have a faster readout than the main image sensor, etc.

Some embodiments pertain to a time-of-flight acquisition method for a time-of-flight camera, the method including: scanning a scene for detecting illumination; determining a time slot for illumination of the scene, based on the scanning result of the scene; and illuminating the scene in the determined time slot, based on a time-division multiple access (TDMA) scheme, as also discussed above for the time-of-flight (ToF) camera. The time-of-flight acquisition method as described herein may be performed by the time-of-flight cameras described herein. As discussed, the scanning of the scene may be performed after a random idle time. The determined time slot may be defined by introducing a time delay in a predefined time-division multiple access (TDMA) scheme. The scanning of a scene may be performed during a scanning mode of the ToF camera, wherein an illumination source of the ToF camera may be off during the scanning mode. As discussed, the time slot may be determined, based on detecting time slots having a higher illumination than an average background illumination. As discussed, the illumination of the scene may be performed within a regular operation mode of the ToF camera. The method may further comprise scanning the scene for detecting illumination within the regular operation mode, as also discussed above. As discussed, the scanning may be performed with a sub-portion of an image sensor of the time-of-flight camera and/or the scanning may be performed with an auxiliary image sensor of the time-of-flight camera.

Returning to FIG. 2, there is illustrated an embodiment of a time-of-flight (ToF) camera 10, which has a processor 13, which may perform the method(s) as described herein. Moreover, the camera 10 has an illumination source 11 (e.g. an array of VCSELs) and an image sensor 12 (e.g. pixel array based on CCD or CMOS or SPADs technology or the like). The processor 13 controls the ToF camera 10, i.e. the illumination source 11 and the image sensor 12 and other entities/units, which are typically included in a ToF, and which are omitted for simplification reasons.

Figure 2:
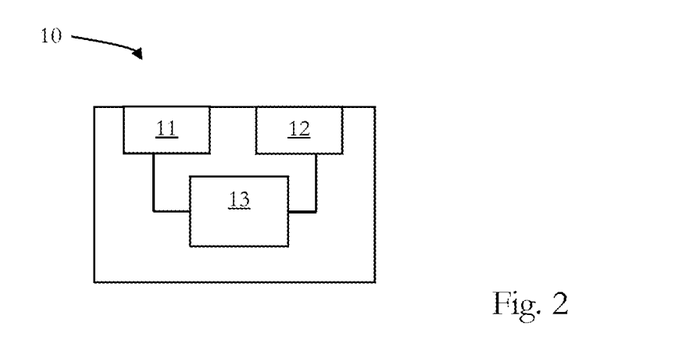
FIG. 2 illustrate a first embodiment of a ToF camera.
Figure 3:
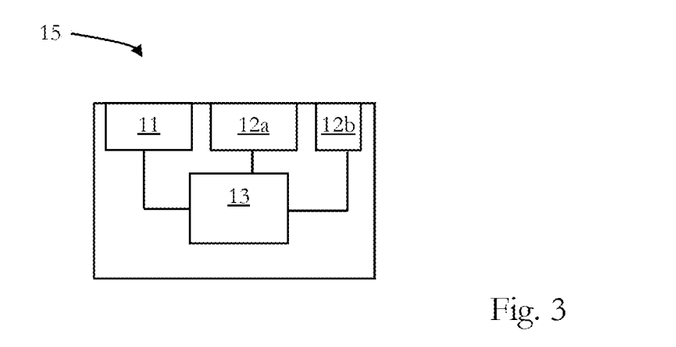
FIG. 3 illustrates a second embodiment of a ToF camera having an auxiliary image sensor.

FIG. 3, illustrates another embodiment of a time-of-flight (ToF) camera 15, which is similar to the ToF camera 10 of FIG. 2, except for that the image sensor has a main image sensor 12a and an auxiliary image sensor 12b. It also has the illumination source 11 and the processor 13, which is connected to the illumination source 11 and the main image sensor 12a and the auxiliary image sensor 12b. The main image sensor 12a is a pixel array sensor (e.g. based on CCD or CMOS or SPADs technology or the like), and the auxiliary image sensor 12b is also a pixel array sensor (e.g. based on CCD or CMOS or SPADs technology or the like), but it is much smaller than the main image sensor 12a having less pixels (e.g. as few as one pixel), and, thus, allows faster readout than the main image sensor 12a. The processor may perform anyone of the time-of-flight acquisition methods described herein.

Figure 4:
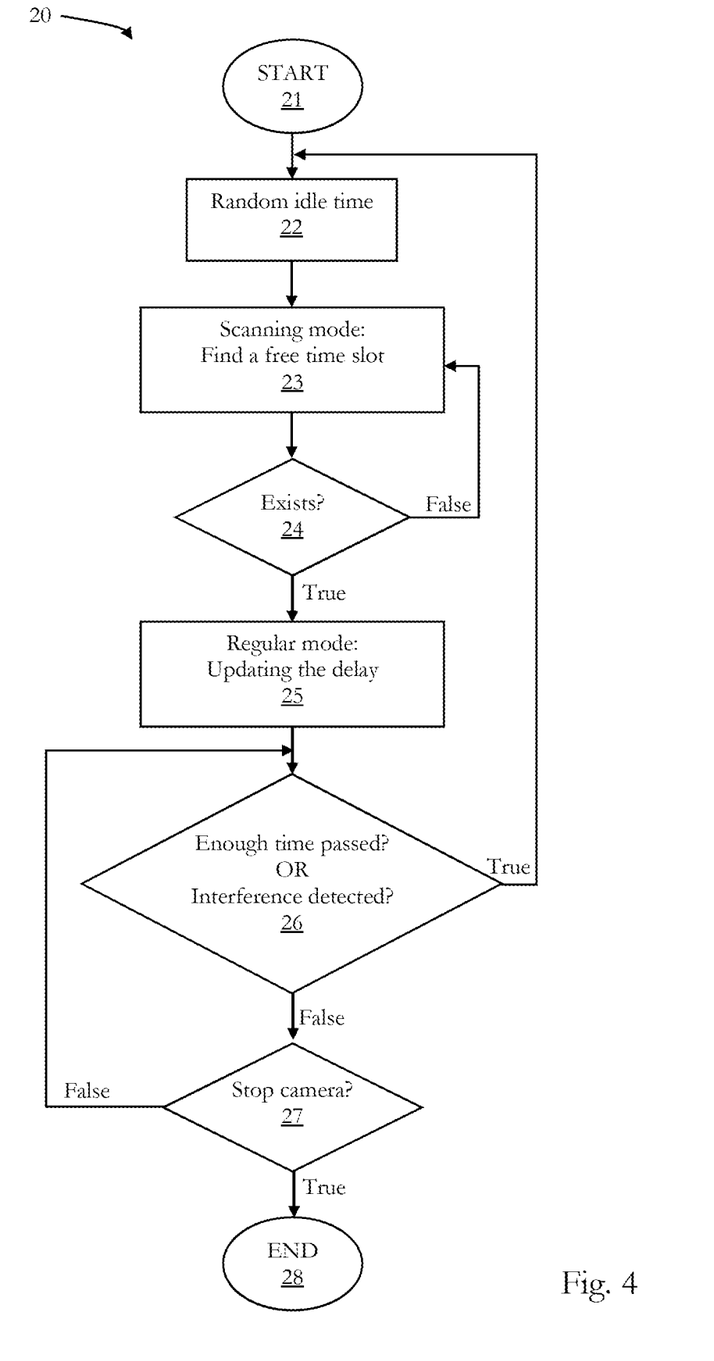
FIG. 4 illustrates a block diagram of an embodiment of a method to a ToF camera, e.g. of FIG. 2 or FIG. 3.

FIG. 4 illustrates a block diagram of a method 20 for time-of-flight (ToF) acquisition, which can be performed, for example, by the ToF camera 10 and/or by the ToF camera 15 discussed under reference of FIGS. 2 and 3, respectively, above, applying an "Asynchronous Time-Division Multiple Access" embodiment, as discussed. The method 20 may also be performed by multiple cameras illuminating a scene, e.g. by cameras 2a and 2b as illustrated in FIG. 1.

The method 20 starts at 21 and before it starts illuminating or scanning the scene, a random idle time is performed/waited at 22. The random idle time is an idle time having a random duration, which is determined based on a random generator.

Typically, on start-up of the ToF camera (e.g. 10 or 15), an oscillator or system clock is starting which determines the overall system clock and, thus, which may also determine the start of a predefine TDMA scheme, on the basis of which ToF measurements are performed.

By introducing the random idle time such a starting point of operation may be shifted by a random time duration. This may reduce the possibility and probability that several ToF cameras go into a following scanning mode or other mode simultaneously, which could then, for example, cause that no illumination is detected, since also other ToF cameras in the environment are min a scanning mode, where illumination is off. The range for this random idle time may be predefined and may be between the minimum, time needed for getting a scanning frame, and a multiple of this time.

At next, the scanning mode is performed at 23. The camera scanning mode may be performed with a ToF camera 10, as illustrated in FIG. 2 having no auxiliary image sensor, or with an auxiliary image sensor 12b of the ToF camera 15, as illustrated in FIG. 15. Further below, two different embodiments of the camera scanning mode with and without auxiliary image sensor are explained.

Figure 5:
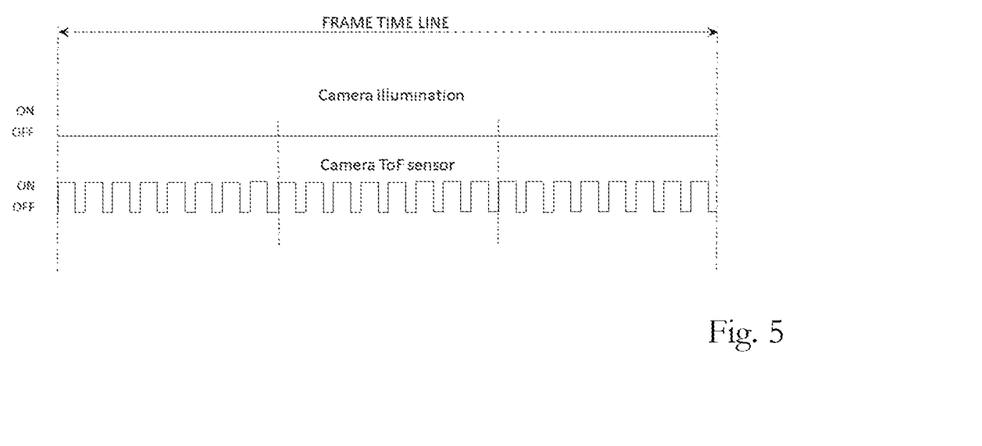
FIG. 5 illustrates a "scanning mode"

A scanning mode, e.g. of the ToF camera 10 of FIG. 2, where the main image sensor and no auxiliary image sensor is used, is illustrated in FIG. 5.

FIG. 5 illustrates one frame having a TDMA scheme with 24 time slots and the associated ToF camera states within the scanning mode of the one frame. Of course, the scanning mode may be performed for multiple frames. In a second line, the illumination state of the illumination source 11 is illustrated and in the lowest line the states of the image sensor 12 are illustrated. In some embodiments, the time slots which are used for scanning may differ from the time slots used for illumination, e.g. the duration of the time slots may differ. For instance, the time slots used for scanning may be smaller, i.e. they have a short duration, then the time slots, which are used for illumination of a scene. By using smaller time slots for scanning, may improve the accuracy of the determination of the location of a potential interference (source), e.g. within a frame time-line.

During the scanning mode, the camera illumination is OFF and, thus, the camera does not illuminate the scene, while the camera ToF sensor can only collect the backscattered signal coming from other cameras sources, or from ambient light. When the camera ToF sensor is ON, the camera gets measurements of the illumination backscattered at the scene (but in this mode coming from other sources), and the camera ToF image sensor 12 is getting 24 different measurements per frame.

Hence, during the scanning mode, the ToF camera switches off its illumination and gets measurements of the scene at different frame time-line slots (i.e. at 24 time slots in this embodiment). As discussed, the intention is to collect any possible illumination coming from other cameras at different time positions of the frame time-line. As also discussed, it is not necessary in all embodiments, to get full sensor array measurements, but a sub-portion of the image sensor can be used. For instance, measurements from the top, center and bottom rows of the sensor array may be enough in some embodiments. This allows to reduce readout times of the image sensor and the amount of image data.

Figure 6:
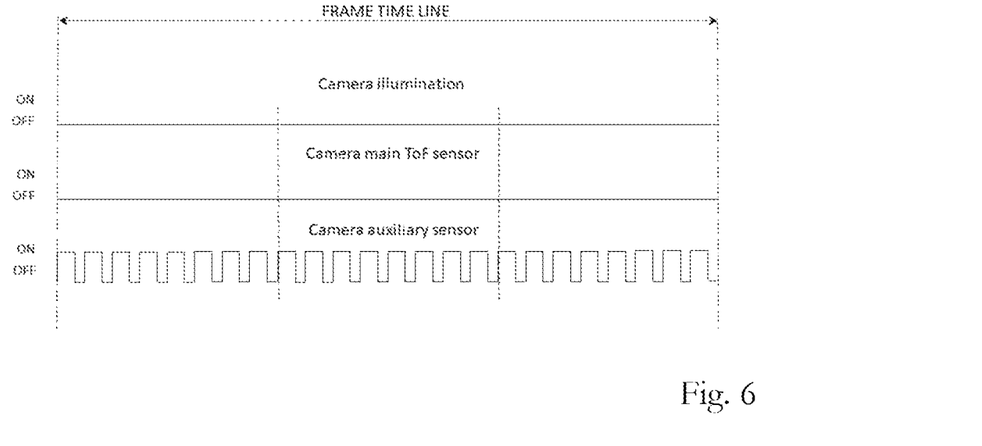
FIG. 6 illustrates a "scanning mode" by using an auxiliary image sensor.

FIG. 6 illustrates a scanning mode, such as performed by ToF camera 15 having an auxiliary sensor 12b. Also here, a TDMA scheme with 24 time slots is used and FIG. 6 illustrates the associated ToF camera states within the scanning mode of the one frame. Of course, the scanning mode may be performed for multiple frames. In a second line, the illumination state of the illumination source 11 is illustrated and in the lowest line the states of the auxiliary image sensor 12b are illustrated.

This implementation of the scanning mode basically corresponds to the implementation of FIG. 5, but in this case of FIG. 6, the 24 measurements per frame are done by the camera auxiliary sensor 12b, while keeping the camera illumination 11 and die camera main ToF sensor 12a OFF.

According to the method 20, after having obtained the scanning information from a frame time-line at 23 (either with auxiliary image sensor (FIG. 6) or without auxiliary image sensor (FIG. 5)), the possible existence of at least one (free) time slot is determined at 24 and the corresponding delay is determined, if one or more free time slots are detected, which is needed to occupy (one of) the free time slot(s).

As discussed above, according to an implementation, per frame time-line slot measurement, the variance of the absolute value of the illumination data (in our notation is S), i.e. $v_i = \text{var}(\text{abs}(S_i))$ is calculated, where the index i identify the frame time-line slot. This results in a vector v, with as many values as time slots. For determining the frame time-line slots occupied by other cameras, a background threshold p is established by calculating the average value of the three smallest values contained in the vector v, and then this result is multiplied by a scalar factor $\alpha$. As mentioned, in the present embodiment it is assumed that there exist at least three free time slots (determined at 24). The factor $\alpha$ is used for considering a possible noise variation of the background illumination. Then, when an element of the vector v is larger than the background threshold p, this indicates that the corresponding frame time-line slot is occupied by the illumination of another camera. After having determined the index i of all the free frame time-line slots in this example, one free time slot is selected that allows the camera to leave at least a free slot between its illumination and the closest occupied slots. Based on the time slot position in the frame time-line, the time delay for using or occupying the selected time slot is calculated. If it is not possible to find a proper free slot, i.e. the answer at 24 is "False", the scanning mode is kept and the method 20 jumps to 22 again and starts with a random idle time at 22 and then performs the scanning mode at 23 again.

Figure 7:
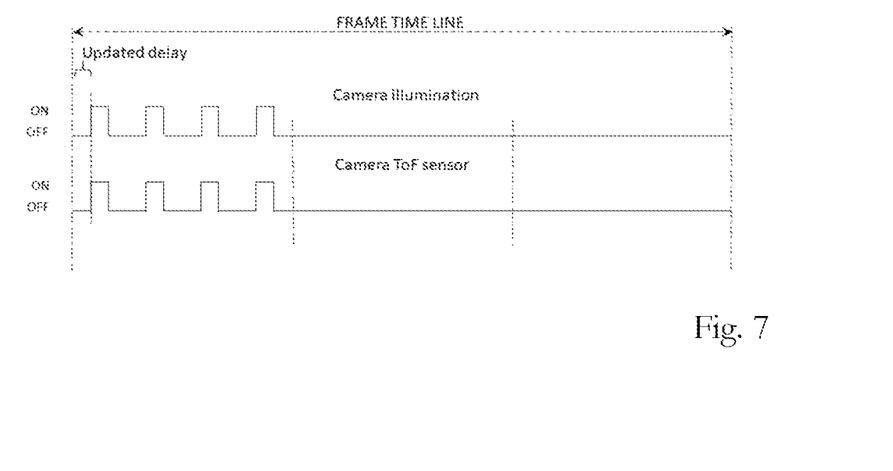
FIG. 7 illustrates a "regular mode", e.g. used by the method of FIG. 4.

If the answer at 24 is "True", i.e. at least one free time slot has been detected (exists), the method goes into a regular mode at 25, which is also illustrated in FIG. 7. FIG. 7 illustrates one frame of the regular mode, wherein in the second line the activity of the illumination 11 and in the third line the activity of the (main) image sensor 12 (12a) is illustrated, which both represent the states of the camera illuminations and the camera ToF sensor per frame. Typically, in the regular mode, the camera ToF sensor performs depth measurements of the scene using its own illumination source. While the camera illumination is ON, the camera illuminates the scene using the modulated signal. When the camera ToF sensor is ON, the camera gets measurements of the illumination, backscattered at the scene. This camera regular mode allows to introduce a time delay in the camera operation, which is zero by default and also, for example, when the ToF camera is started. In this case, the camera ToF sensor obtains four different measurements per frame, just as an example, and without limiting the disclosure in that regard.

In the regular mode, the camera takes the necessary full sensor array measurements (also known as components) for calculating the depth information of the image. The number of measurements per frames depends on the ToF technology and the embodiments, and can be adapted as necessary (e.g. some technologies may need as few as a single measurement for calculating the depth information of the image). As mentioned, in the present example, four measurements per frame are collected, without limiting the present disclosure in that regard.

In the regular mode, as can also be taken from FIG. 7, the point of time at which the camera/method starts the sequence of acquiring measurements in the following frames is delayed by the delay which has been calculated for occupying the determined free time slot. Once the camera is switched on, its configuration and its own clock initially determinates point of times of start of the frames and die corresponding point of times when measurements are taken. In some embodiments, the internal clock timings of the ToF camera are the reference which is used for determining where/when (in the frame time-line) the different slots are, and, thus, by modifying the camera timings based on the calculated delay interferences with other ToF cameras may be avoided.

Generally, in some embodiments, the frequency of the system clocks of different cameras may differ (drift), due to differences on their setup-up or due to hardware inaccuracies. The drift between the clocks of two different cameras may cause that the relative positions between the TDMA time slots of them vary within the frame time-line of each camera, which may cause that time slots interfere with each other after some time. Thus, in some embodiments, the frame time-line position of the camera is adjusted to ensure that an interference does not occur. This readjustment is repeated after a predefined time interval at 26, which may depend, for example, on an expected drift between cameras. If the predefined time interval is determined to be over at 26, the method 20 jumps to 22 again.

When a new camera, e.g. already illuminating a different scene, moves and comes into the scene illuminated by another camera, interference could be cause. This interference may occur during the (brief) interval in which the cameras are applying their regular modes, e.g. until any of the cameras readjust its frame time-line position. For reducing this possible interference interval, in some embodiments, it is possible to force a frame time-line position readjustment, which is triggered by an algorithm at 26 which is able to detect an interference in regular mode measurements.

The method 20 and also the determination at 26 are repeated until the camera is stopped at 27. e.g. based on a user input, wherein in this case the method ends at 28.

Figure 8:
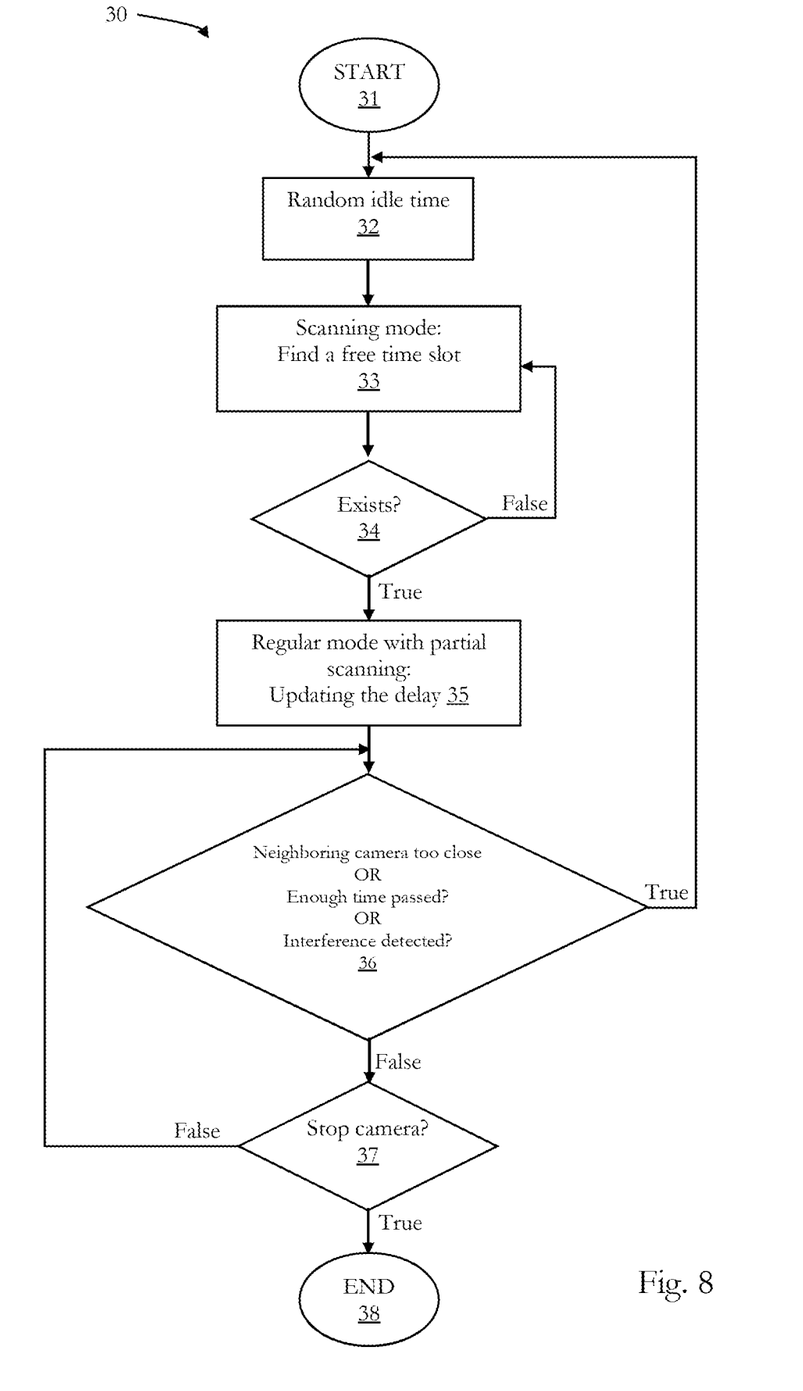
FIG. 8 illustrates a block diagram of another embodiment of a method to a ToF camera, e.g. of FIG. 2 or FIG. 3.

Another embodiment of a method 30 for time-of-flight (ToF) acquisition, which can be performed, for example, by the ToF camera 10 and/or by the ToF camera 15 discussed under reference of FIGS. 2 and 3, respectively, above, applying an "Asynchronous Time-Division Multiple Access" embodiment, as discussed, is illustrated in FIG. 8. The method 30 may also be performed by multiple cameras illuminating a scene, e.g. by cameras 2a and 2b as illustrated in FIG. 1.

FIG. 8 is a block diagram illustrating the operation of a ToF camera, wherein die camera scanning mode corresponds to the two possible implementations discussed above or under of reference of FIGS. 4, 5 and 6, i.e. scanning with or without auxiliary image sensor. However, the camera regular mode includes a partial scanning, as will also discussed under reference of FIGS. 9 (without auxiliary image sensor) and 10 (with auxiliary image sensor).

Figure 9:
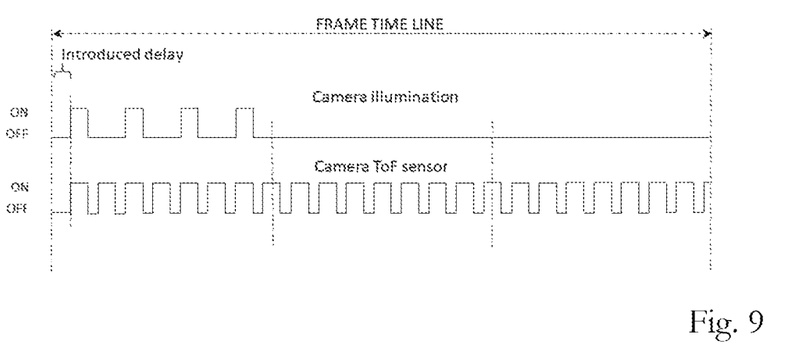
FIG. 9 illustrates a "regular mode with partial scanning" as performed by the method of FIG. 8.
Figure 10:
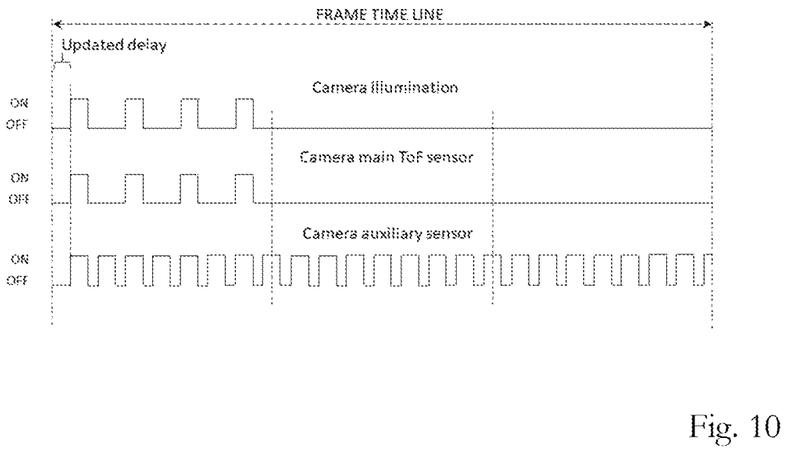
FIG. 10 illustrates a "regular mode with partial scanning" by using, in addition to a main sensor, an auxiliary image sensor as performed by the method of FIG. 8.

The regular mode with partial scanning allows a constant monitoring of the frame time-line slot occupied by neighbouring cameras, while simultaneously, for example, full sensor array measurements are taken, based on the camera's own illumination. In some embodiments, it is a hybrid mode between the previously explained scanning mode and the regular mode. The regular mode with partial scanning introduces the possibility of triggering a frame time-line position readjustment, when a neighbouring camera is occupying a slot too close. However, the (full) scanning mode may be still necessary to avoid the possibility of an interference in the time slots that the camera is occupying, and may, therefore, not be detectable with a partial scanning.

As discussed, alternatively, the scanning information can be obtained by a smaller secondary sensor array, which is also referred to as auxiliary image sensor, see, for example, FIG. 3, auxiliary image sensor 12b. As mentioned, in some embodiments the auxiliary image sensor does not obtain scanning information of the full image, but the auxiliary image sensor has less pixels than the main image sensor, and it may be useful, for example, when the main ToF sensor array is not fast enough for obtaining many scanning frame time-line slot measurements, or when the transition between the two modes (scanning and regular) is not fast. Also, the auxiliary image sensor may use a technology (e.g. CCD or CMOS or SPADs or the like) which can be different from the main image sensor.

In the following, method 30 will be briefly explained also by referring to method 20 of FIG. 4, since the methods 20 and 30 basically correspond to each other, except for the regular mode with partial scanning.

At 31, the method 30 starts and, as discussed above, a random idle time is introduced at 32.

After the random idle time is over, the (full) scanning mode for finding a free time slot is started 33 and, as discussed above, FIGS. 5 and 6, illustrate the scanning mode without auxiliary image sensor (FIG. 5, see discussion above) and with auxiliary image sensor (FIG. 6).

At 34, as discussed above for 24 of FIG. 4, if no free time slot is found ("False"), the method 30 jumps back to the idle time at 32, while in the case that one or more free time slots are determined, as discussed above, the method goes in the regular mode with partial scanning at 35.

FIG. 9 illustrates an implementation of a camera regular mode with partial scanning, which may be performed at 35, wherein the scanning is performed with the (main) image sensor (e.g. image sensor 12 of the ToF camera 10 in FIG. 2). FIG. 9 represents the states of the ToF camera illuminations (second line) and the camera ToF sensor (third line) per frame, wherein one frame is illustrated in FIG. 9.

In the present embodiment, the ToF camera (method 30) performs four different measurements per frame, while using its own illuminations, and does 20 different measurements per frame, using either any backscattered signal coming from other cameras sources or the ambient light (without limiting the present disclosure in that regard). While die camera illumination (e.g. 11, FIG. 2 or 3) is ON, the camera illuminates the scene. When the camera ToF sensor (e.g. 12 of FIG. 2) is ON, the camera gets measurements.

FIG. 10 illustrates another embodiment or another implementation of the camera regular mode with partial scanning, wherein the partial scanning is performed with an auxiliary image sensor (e.g. auxiliary image sensor 12b). FIG. 10 representing the states of the camera illuminations (second line), the camera main ToF sensor (third line) and the camera auxiliary sensor (fourth line) per frame, wherein one frame is illustrated in FIG. 10. Also here, the camera exemplary performs four measurements with the main ToF sensor per frame, while using its own illumination. In addition, the camera auxiliary sensor (e.g. 12b, FIG. 3) performs 24 measurements per frame, 20 of them while the camera illumination and the camera main sensor are switched OFF.

Moreover, at 35, the delay as determined in 33 and 34 is introduced (see also "delay" in FIG. 9 and FIG. 10), in order to ensure that the selected free time slot is used.

At 36, as discussed above, it is determined whether an interference is detected or whether the predefined time interval is over and if this is true, the method 30 jumps back to 32 (random idle time). Moreover, at 36, it is checked whether during the partial scanning at 35 it is detected that the neighboring camera came (too) close ("True"), also then the method 30 jumps back to 32.

If none of these events is detected ("False"), the method checks at 37, whether the camera is to be stopped, e.g. based on a user input, and if not, then the method 30 jumps back to 36, otherwise the camera is stopped at 37 and the method ends at 38.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight camera, including:
an illumination source for illuminating a scene;
an image sensor for detecting light; and
a processor configured to:
control the image sensor for scanning a scene for detecting illumination;
determine a time slot for illumination of the scene, based on the scanning result of the scene; and
control the illumination source to illuminate the scene in the determined time slot, based on a time-division multiple access scheme.
(2) The time-of-flight camera of (1), wherein the scanning of the scene is performed after a random idle time.
(3) The time-of-flight camera of (1) or (2), wherein the determined time slot is defined by introducing a time delay in a predefined time-division multiple access scheme.
(4) The time-of-flight camera of (3), wherein the scanning of a scene is performed during a scanning mode.
(5) The time-of-flight camera of (4), wherein the illumination source is off during the scanning mode.
(6) The time-of-flight camera of anyone of (1) to (5), wherein the time slot is determined, based on detecting time slots having a higher illumination than an average background illumination.
(7) The time-of-flight camera of anyone of (1) to (6), wherein the illumination of the scene is performed within a regular operation mode.
(8) The time-of-flight camera of (7), further including scanning the scene for detecting illumination within the regular operation mode.
(9) The time-of-flight camera of anyone of (1) to (8), wherein the scanning is performed with a sub-portion of the image sensor.
(10) The time-of-flight camera of anyone of (1) to (9), wherein the image sensor comprises an auxiliary image sensor and wherein the scanning is performed with the auxiliary image sensor.
(11) A time-of-flight acquisition method for a time-of-flight camera, the method including:
scanning a scene for detecting illumination;
determining a time slot for illumination of the scene, based on the scanning result of the scene; and
illuminating the scene in the determined time slot, based on a time-division multiple access scheme.
(12) The time-of-flight acquisition method of (11), wherein the scanning of the scene is performed after a random idle time.
(13) The time-of-flight acquisition method of (11) or (12), wherein the determined time slot is defined by introducing a time delay in a predefined time-division multiple access scheme.
(14) The time-of-flight acquisition method of (13), wherein the scanning of a scene is performed during a scanning mode of the time-of-flight camera.
(15) The time-of-flight acquisition method of (14), wherein an illumination source of the time-of-flight camera is off during the scanning mode.
(16) The time-of-flight acquisition method of anyone of (11) to (15), wherein die time slot is determined, based on detecting time slots having a higher illumination than an average background illumination.
(17) The time-of-flight acquisition method of anyone of (11) to (16), wherein the illumination of the scene is performed within a regular operation mode of the time-of-flight camera.
(18) The time-of-flight acquisition method of (17), further including scanning the scene for detecting illumination within the regular operation mode.
(19) The time-of-flight acquisition method of anyone (11) to (18), wherein the scanning is performed with a sub-portion of an image sensor of the time-of-flight camera.
(20) The time-of-flight acquisition method of anyone of (11) to (19), wherein the scanning is performed with an auxiliary image sensor of the time-of-flight camera.
(21) A computer program including program code causing a computer to perform the method according to anyone of (11) to (20), when being carried out on a computer.
(22) A non-transitory computer-readable recording medium that stores therein a computer program product, which, when executed by a processor, causes the method according to anyone of (11) to (20) to be performed.

The invention claimed is:
1. A time-of-flight camera, comprising:
an illuminator to illuminate a scene;
an image sensor to detect reflected light; and
a processor configured to:
control the image sensor to scan a scene to detect the reflected light due to illumination of the scene by another time-of-flight camera;
determine a time slot for illumination of the scene by the illuminator of the time-of-flight camera, based on the scanning result of the scene; and after determining the time slot, control the illuminator of the time-of-flight camera to illuminate the scene in the determined time slot, based on a time-division multiple access scheme.

2. The time-of-flight camera of claim 1, wherein the scanning of the scene is performed after a random idle time.

3. The time-of-flight camera of claim 1, wherein the determined time slot is defined by introducing a time delay in a predefined time-division multiple access scheme.

4. The time-of-flight camera of claim 3,
wherein the scanning of a scene is performed during a scanning mode, and
wherein the illuminator is off during the scanning mode.

5. The time-of-flight camera of claim 4,
wherein the determined time slot is when the another time-of-flight camera does not illuminate the scene, and
wherein the time-division multiple access scheme for the time-of-flight camera is the same as another time-division multiple access scheme for the another time-of-flight camera.

6. The time-of-flight camera of claim 1, wherein the time slot is determined, based on detecting time slots having a higher illumination than an average background illumination.

7. The time-of-flight camera of claim 1, wherein the illumination of the scene is performed within a regular operation mode of the time-of-flight camera.

8. The time-of-flight camera of claim 7, wherein the processor controls the image sensor to scan the scene to detect illumination within the regular operation mode.

9. The time-of-flight camera of claim 1, wherein the scanning is performed with a sub-portion of the image sensor.

10. The time-of-flight camera of claim 1,
wherein the image sensor comprises an auxiliary image sensor, and
wherein the scanning is performed with the auxiliary image sensor.

11. A time-of-flight acquisition method for a time-of-flight camera, the method comprising:
scanning a scene to detect reflected light due to illumination of the scene by another time-of-flight camera;
determining a time slot for illumination of the scene by an illuminator of the time-of-flight camera, based on the scanning result of the scene; and
after determining the time slot, illuminating the scene in the determined time slot, based on a time-division multiple access scheme.

12. The time-of-flight acquisition method of claim 11, wherein the scanning of the scene is performed after a random idle time.

13. The time-of-flight acquisition method of claim 11, wherein the determined time slot is defined by introducing a time delay in a predefined time-division multiple access scheme.

14. The time-of-flight acquisition method of claim 13, wherein the scanning of the scene is performed during a scanning mode of the time-of-flight camera.

15. The time-of-flight acquisition method of claim 14, wherein the illuminator of the time-of-flight camera is off during the scanning mode.

16. The time-of-flight acquisition method of claim 11, wherein the time slot is determined, based on detecting time slots having a higher illumination than an average background illumination.

17. The time-of-flight acquisition method of claim 11, wherein the illumination of the scene is performed within a regular operation mode of the time-of-flight camera.

18. The time-of-flight acquisition method of claim 17, further comprising scanning the scene to detect illumination within the regular operation mode.

19. The time-of-flight acquisition method of claim 11, wherein the scanning is performed with a sub-portion of an image sensor of the time-of-flight camera.

20. The time-of-flight acquisition method of claim 11, wherein the scanning is performed with an auxiliary image sensor of the time-of-flight camera.

* * * * *